United States Patent [19]

Suzuki et al.

[11] Patent Number: 5,209,759
[45] Date of Patent: May 11, 1993

[54] METHOD FOR PRODUCING A METALLIC OXIDE-HYDROGEN SECONDARY BATTERY

[75] Inventors: Kohei Suzuki; Hiroshi Kawano, both of Ibaraki; Nobuyuki Yanagihara, Hirakata; Akira Ota, Osaka, all of Japan

[73] Assignee: Matsushita Electric Industrial Co., Ltd., Osaka, Japan

[21] Appl. No.: 738,336

[22] Filed: Jul. 31, 1991

[30] Foreign Application Priority Data

Mar. 22, 1991 [JP] Japan .................................. 3-58533

[51] Int. Cl.$^5$ ................................................. H01M 6/14
[52] U.S. Cl. ...................................... 29/623.1; 29/730; 205/57; 205/60
[58] Field of Search ............... 29/623.1, 730; 204/2.1; 205/57, 60

[56] References Cited

U.S. PATENT DOCUMENTS 4,851,306 7/1989 Kaun et al. .................... 29/623.1
4,999,906 3/1991 Van Beek et al. ............. 29/623.1

*Primary Examiner*—Wayne Langel
*Attorney, Agent, or Firm*—Ratner & Prestia

[57] ABSTRACT

A method for producing a metallic oxide-hydrogen secondary battery is provided. The method comprises the steps of disposing generating elements consisting of positive electrodes containing metallic oxides, negative electrodes containing hydrogen-absorbing alloys, and separators in a plurality of cell chambers equipped with safety valves, each cell chamber having different capacity; pouring an electrolyte into each cell chamber; and repeating charge and discharge cycles on condition that safety valves work at pressure G in the range of $1 < G \leq 6$ atm so that the amount of the electrolyte in each cell chamber is kept constant.

6 Claims, 3 Drawing Sheets

METHOD FOR PRODUCING A METALLIC OXIDE-HYDROGEN SECONDARY BATTERY

BACKGROUND OF THE INVENTION

1. Field of the Invention

The present invention relates to a method for producing a metallic oxide-hydrogen secondary battery which uses as negative electrodes hydrogen-absorbing electrodes capable of reversibly absorbing and desorbing hydrogen.

2. Description of the Prior Art

In general, hydrogen-absorbing electrodes which use, as components, alloys capable of reversibly absorbing and desorbing hydrogen are produced by the following method:

First, various kinds of metals are weighed in accordance with desired compositions of hydrogen-absorbing alloys to be produced. A mixture of these metals are dissolved by using an arc melting furnace to produce hydrogen-absorbing alloys having desired compositions. Then, these hydrogen-absorbing alloys are ground to powders each having a size of 300 mesh or less. These powders are kneaded with a binding agent so as to be uniform paste. Electrode bases such as foaming porous metals and panting metals are pressure-charged or coated with this paste, followed by drying to produce hydrogen-absorbing electrodes which are to be used as negative electrodes.

These negative electrodes, positive electrodes such as nickel positive electrodes, and separators are disposed in a battery case, thereby forming a metallic oxide-hydrogen secondary battery. When this battery is charged and discharged, a required amount of alkaline electrolyte is uniformly provided in each cell chamber in the battery case. As an alkaline electrolyte used in the metallic oxide-hydrogen secondary battery, an aqueous KOH solution is generally used. Moreover, as a battery case, in view of strong alkalinity of the electrolyte, moldability, and cost, various kinds of plastics such as an acrylonitrile-styrene (AS) copolymer are generally used.

The above-mentioned metallic oxide-hydrogen secondary battery has an electro motive force of about 1.2 V and is usually connected in series except when it is used for a special purpose. In order to obtain a desired voltage, a plurality of cells are connected with each other. When this battery is used as a portable power source, it is preferred that this battery is formed into a monoblock multi-cell type battery having an output voltage of 6 V or 12 V.

The battery case is divided into a plurality of cell chambers with inter cell partitions and each cell chamber is designed to have predetermined capacity. However, it is difficult to make the capacity of each cell chamber completely uniform. Moreover, thickness and porosity of generating elements including the negative electrodes, the positive electrodes, and the separators differ from cell to cell. Accordingly, even though an equal amount or an equal level of electrolyte is poured into each cell chamber, respective liquid surfaces are different due to the decrease in the amount of electrolyte and the permeation of the electrolyte into the generating elements, which are caused by the repetition of charge and discharge cycles. As a result, discharge capacity of the respective cells becomes different, and the battery life is decreased.

Furthermore, in the metallic oxide-hydrogen secondary battery, the capacity of the negative electrodes is greater than that of the positive electrodes. During overcharge, oxygen gas is generated at the positive electrodes and this oxygen gas is absorbed at the negative electrodes, thereby maintaining internal pressure of the battery at a constant value. The reaction in which oxygen gas is absorbed at the negative electrodes is greatly influenced by the amount of the electrolyte. Therefore, it is required that the amount of the electrolyte be regulated. When the amount of the electrolyte is small, the internal resistance is increased, leading to a decrease in the discharge capacity. In order to avoid this, a minimum amount of the electrolyte required for a normal discharge reaction should be supplied. In contrast, when the amount of the electrolyte is large, oxygen gas is generated at the positive electrodes without absorbing at the positive electrodes, and then the amount of the electrolyte is decreased. As a result, the internal resistance is increased and the discharge capacity is decreased.

A safety value is generally used for the purpose of regulating pressure in each cell. When a safety valve working at high pressure is used, because of the low resistivity of the case with respect to pressure and the low strength of a contact portion between the case and a lid, the contact portion is likely to be damaged, thereby causing the leakage of the electrolyte. As a result, battery capacity is decreased. For safety, it is desired that a safety valve working at high pressure is not used.

In a metallic oxide-hydrogen secondary battery using a case dividing into a plurality of cell chambers, each having different capacity, the amount of the electrolyte supplied in each cell chamber is regulated and the respective electrolyte levels are adjusted. That is, the capacity of each cell chamber is measured, and the electrolyte is poured into each cell chamber in accordance with a measured value. However, according to this method, it takes a long time to pour the electrolyte, and it is difficult to regulate the amount of the electrolyte to be supplied since the electrolyte is supplied in accordance with the measured value. Moreover, when the charge and discharge cycles are repeated, the amount of the electrolyte which is absorbed at the elements are not constant depending on the cells, so that there are some cells in which the amount of the electrolyte deviates from the optimum value.

SUMMARY OF THE INVENTION

A method for producing a metallic oxide-hydrogen secondary battery of this invention, which overcomes the above-discussed and numerous other disadvantages and deficiencies of the prior art, comprises positive electrodes containing one or more metallic oxides, negative electrodes containing hydrogen-absorbing alloys which electrochemically absorb and desorb hydrogen, separators, an alkaline electrolyte, a closed-type case having a plurality of cell chambers, each cell container having a different capacity, which accommodate the positive electrodes, the negative electrodes, the separators, and the electrolyte, and safety valves provided on respective cell chambers in the closed-type case, wherein the method comprises the steps of:

disposing the positive electrodes, the negative electrodes, and the separators in the cell chambers in the closed-type case;

pouring the electrolyte in a predetermined amount or more into the cell chambers; and repeating charge and discharge cycles on condition that the safety valves work at pressure G in the range of $1 < G \leqq 6$ atm so that an excess of the electrolyte is desorbed outside the cell chambers and the amount of the electrolyte in each cell chamber is kept constant.

In a preferred embodiment, the amount of the electrolyte is in the range of 1.5 to 4.0 ml per discharge capacity (Ah) of the positive electrodes.

In a preferred embodiment, the negative electrodes contain hydrophobic resins.

In a preferred embodiment, the specific gravity of the electrolyte is in the range of 1.15 to 1.30 at 25° C.

In a preferred embodiment, a charger regulating a total voltage of the battery is used for charging each cell chamber.

Another method for producing an alkaline metallic oxide-hydrogen secondary battery includes positive electrodes containing one or more metallic oxides, negative electrodes containing hydrogen-absorbing alloys which electrochemically absorb and desorb hydrogen, an alkaline electrolyte, a closed-type case made of plastics having a plurality of cell chambers, each cell chamber having a different capacity, which accommodate the positive electrodes, the negative electrodes, the separators, the electrolyte, and safety valves provided on respective cell chambers in the closed-type case, wherein the method comprises the steps of:

disposing the positive electrodes, the negative electrodes, and the separators in the cell chambers in the closed-type case;

pouring the electrolyte in a predetermined amount or more into the cell chambers; and repeating charge and discharge cycles on condition that the safety valves work at pressure G in the range of $1.2 \leqq G \leqq 4$ atm so that an excess of the electrolyte is desorbed outside the cell chambers and the amount of the electrolyte in each cell chamber is kept constant.

Thus, the invention described herein makes possible the objectives of (1) providing a method for producing a metallic oxide-hydrogen secondary battery which has a plurality of cell chambers and stable discharge capacity and in which the amount of an electrolyte is automatically regulated even when cells are different in capacity; and (2) providing a method for producing a highly safe metallic oxide-hydrogen secondary battery.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The present invention will be described with reference to the drawings.

Positive electrodes used in the present invention include one or more metallic oxides. As metallic oxides, nickel oxides are preferably used.

Negative electrodes used in the present invention include hydrogen-absorbing alloys capable of electrochemically absorbing and desorbing hydrogen. An example of this hydrogen-absorbing alloy includes $AB_5$ type multi-alloy (alloy formed from a plurality of metals) containing as its main components a misch metal and nickel. Electrode bases such as foaming porous metals and panting metals are pressure-charged or coated with the hydrogen-absorbing alloys, followed by drying, thereby forming negative electrodes.

A closed-type case used in the present invention has a plurality of cell chambers accommodating positive electrodes, negative electrodes, and separators, and each cell chamber has a different capacity. Since the electrolyte to be used is alkaline, the case is preferably made of plastics such as an acrylonitrile-styrene (AS) copolymer. The electrolyte used in the present invention is an alkaline aqueous solution, and for example, an aqueous KOH solution is preferably used.

Figure 1A:
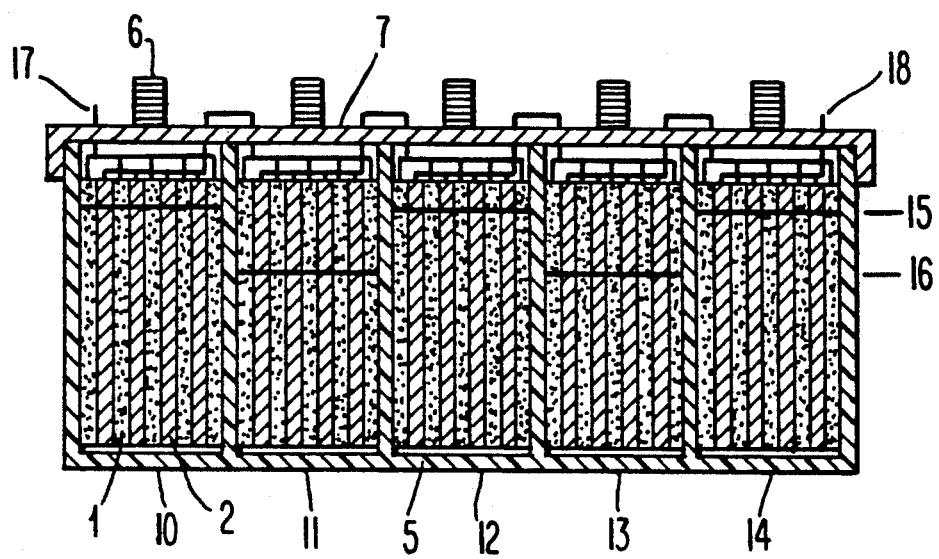
FIG. 1A is a cross-sectional view showing a typical construction of a monoblock multi-cell secondary battery according to the present invention.
Figure 1B:
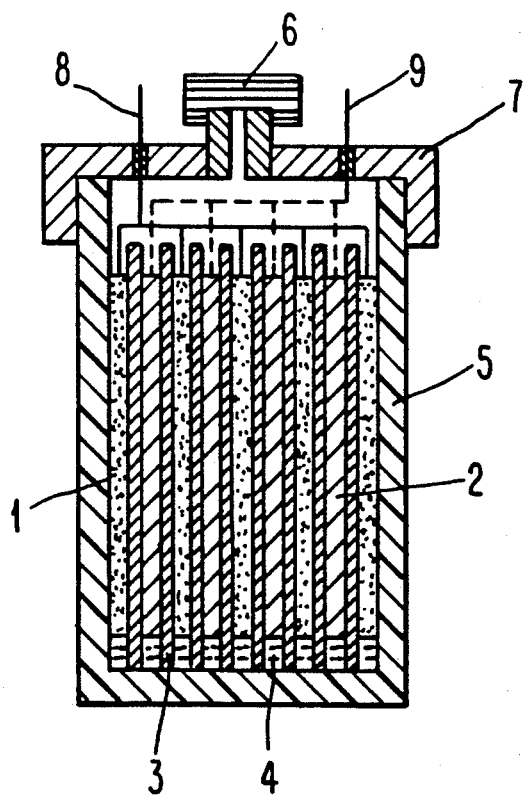
FIG. 1B is a cross-sectional view showing a typical construction of a cell.

FIG. 1A shows a monoblock multi-cell secondary battery according to the present invention, and FIG. 1B shows a typical construction of a cell.

In FIGS. 1A and 1B, sizes and porosity of generating elements including negative electrodes 1, positive electrodes 2, and separators 3 are different depending on respective cells 10 to 14. Accordingly, when an equal amount or an equal level of electrolyte is poured into the respective cells 10 to 14 in a monoblock case 5 made from an AS resin, it is observed that the amount of the electrolyte differs from cell to cell in the course of repetitions of charge and discharge cycles. In FIG. 1A, since the cells 10, 12, and 14 have a large amount of electrolyte (each liquid level is denoted as the reference numeral 15), little reaction in which oxygen gas is absorbed at the negative electrodes occurs. In contrast, since the cells 11 and 13 have a small amount of electrolyte (each liquid level is denoted as the reference numeral 16), the upper portions of the negative electrodes which are exposed to atmosphere in the battery absorb oxygen gas.

When the charge and discharge cycles are further repeated, the amount of the electrolyte in the cells 10, 12, and 14 is decreased and internal pressure in each cell is increased. When the liquid level 15 is lowered to the level 16, the reaction in which oxygen gas is absorbed at the negative electrodes comes to equilibrium with the reaction in which oxygen gas is generated at the positive electrodes. As a result, the internal pressure in each cell becomes constant, and the amount of electrolyte is not decreased any more. At this time, the respective discharge capacity of the cells 10, 12, and 14 in which the respective liquid levels are lowered from the level 15 to the level 16 are the same as those of the cells 11 and 13.

For the purpose of automatically regulating the amount of the electrolyte and the liquid level of each cell, a safety valve 6 (non-return valve) is provided on a lid 7 as shown in FIG. 1B. This safety valve works at relatively low pressure. In FIG. 1B, the reference numerals 8 and 9 denote a negative electrode lead and a positive electrode lead, respectively. These leads connect a plurality of cells in series, and as shown in FIG. 1A, these leads are drawn out as a negative terminal 17 and a positive terminal 18, respectively. If each cell is not provided with the safety valve 6, oxygen gas generated by the decomposition of water during overchange is desorbed from each cell and the amount of the electrolyte continues to decrease, leading to a decrease in the discharge capacity. Moreover, when the safety valve 6 working at high pressure is used, the case 5 or the contact portion between the case 5 and the lid 7 is broken. As a result, an electrolyte 4 is leaked out or desorbed outside the case 5 together with oxygen gas during the operation of the safety valve 6. After the cell is broken, the amount of the electrolyte continues to decrease, leading to a decrease in the discharge capacity like the cell which is used with the use of no safety valve. Therefore, in order to prevent the decrease in the electrolyte or the damage of the case 5, it is required that the working pressure G of the safety valve 6 is in the range of $1 < G \leq 6$ atm, and preferably in the range of $1.2 \leq G \leq 4$ atm.

Furthermore, when the amount of the electrolyte is small, the internal pressure of the cells is increased, and the discharge capacity is decreased. In contrast, when the amount of the electrolyte of the cells is large, the negative electrodes which have larger discharge capacity than the positive electrodes are completely charged along with the generation of oxygen gas at the positive electrodes without absorbing oxygen gas and hydrogen is generated at the negative electrodes thereby. Because of this, even when the amount of the electrolyte reaches the optimum value at which oxygen gas is absorbed at the negative electrodes, the internal pressure is increased due to the hydrogen generated at the negative electrodes and the amount of the electrolyte continues to decrease. This decrease in the electrolyte causes the internal pressure to increase, and the discharge capacity is decreased. Accordingly, in order to obtain stable discharge capacity, it is important that the amount of the electrolyte to be poured into each cell chamber is optimized. This optimum amount is preferably in the range of 1.5 to 4.0 ml per discharge capacity of the positive electrodes.

A method for providing the negative electrodes with hydrophobic resins such as fluororesins is useful for improving an oxygen gas-absorbing reaction at the negative electrodes and preventing a rapid increase in the internal pressure of the battery. In the gas phase, liquid phase and solid phase reaction in which oxygen gas is absorbed at the negative electrodes, when the negative electrodes are covered with the electrolyte perfectly, their absorptivity of oxygen gas is decreased. According to the present invention, in order to provide the surface of the negative electrodes with water repellency, the negative electrodes are coated with or contain hydrophobic resins, whereby a large portion of the negative electrodes can directly come into contact with the gas phase, and the absorptivity of oxygen gas at the negative electrodes can be increased. Moreover, a decrease in the discharge capacity of the battery caused by the splash of an excessive amount of the electrolyte can be prevented. As described above, it is preferred that the negative electrodes are coated with or contain hydrophobic resins.

When the concentration of the aqueous KOH solution is increased, even though initial discharge capacity is satisfactory, cycle life is degraded because of the corrosivity of KOH. In contrast, when the concentration of the aqueous KOH solution is low, even though cycle life is satisfactory, initial discharge capacity is decreased. In order to overcome the above-mentioned problems and obtain well-balanced battery characteristics, the range of the concentration of the aqueous KOH solution needs to be optimized. The specific gravity thereof is preferably in the range of 1.15 to 1.30 at 25° C.

EXAMPLE

The present invention will be further described by way of illustrating the examples.

EXAMPLE 1

First, misch metal (Mm) containing 20% by weight of lanthanum (La) having purity of 99.5% or more, nickel (Ni), manganese (Mn), aluminum (Al), and cobalt (Co) were mixed in a predetermined proportion. A mixture so obtained was dissolved in an arc melting furnace to produce alloys each having a composition of $MmNi_{4.0}Mn_{0.3}Al_{0.3}Co_{0.4}$. These alloys were ground to powders each having a size of 300 mesh or less under an inactive atmosphere. Then, a polymeric binding agent was added to the powders, and foaming porous metals which are electrode bases were pressure-charged with the powders to produce hydrogen-absorbing electrodes for negative electrodes.

As positive electrodes, nickel electrodes were used. The nickel electrodes were put in separators in a bag shape. Then, 10 positive electrodes and 11 negative electrodes were alternately combined to form a group of electrodes. This group of electrodes was put in each cell chamber in a monoblock battery case comprising 5 cell chambers. Next, an aqueous KOH solution having a specific gravity of 1.25 (25° C.) as an electrolyte was poured into each cell chamber, 70 ml at a time. A nickel-hydrogen secondary battery having an output voltage of 6 V was formed by connecting 5 cell chambers in series. This battery was denoted as Battery A. Battery A was not provided with a lid.

In the same way as above, a group of electrodes was produced. This group of electrodes was put in each cell chamber in a monoblock battery case comprising 5 cell chambers. Next, an aqueous KOH solution having a specific gravity of 1.25 as an electrolyte was poured into each cell chamber, 70 ml at a time. Safety valves working at pressure G of 1.2 atm were provided on a lid, after which a nickel-hydrogen secondary battery having an output voltage of 6 V was formed by connecting 5 cell chambers in series. Moreover, the side surface of the case was reinforced with a metal plate so as to prevent the battery from deforming due to the internal pressure. This battery was denoted as Battery B. In the same way, batteries provided with safety valves, each working at pressure G of 3, 4, 6, and 9 atm were denoted as Batteries C, D, E, and F, respectively.

Figure 2:
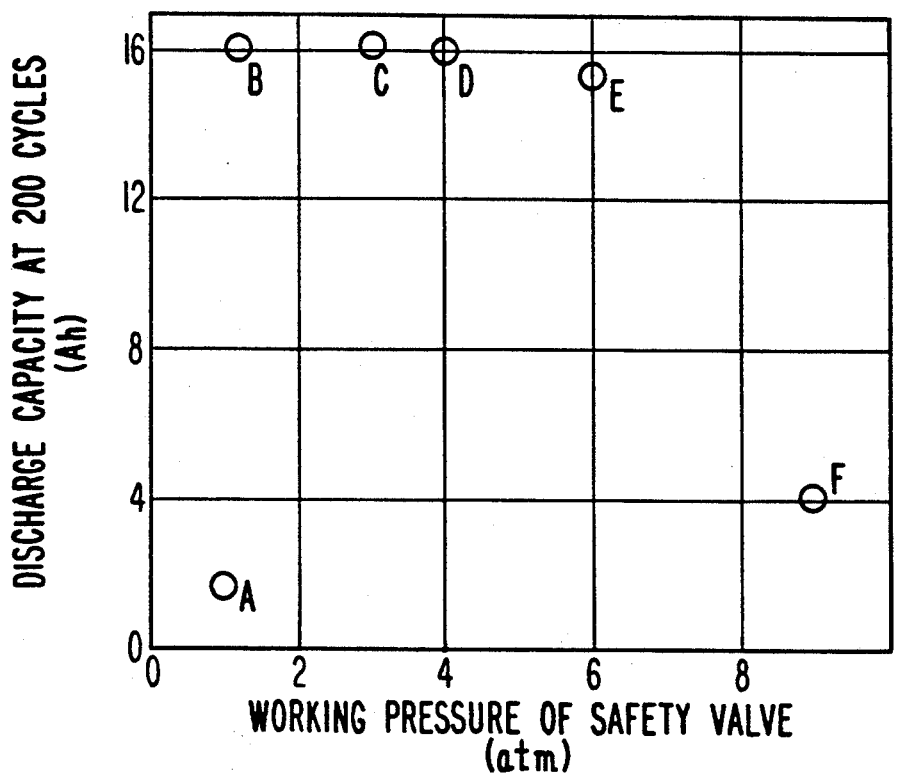
FIG. 2 is a graph showing the relationship between the working pressure of safety valves and the discharge capacity of respective Batteries A to F of Example 1 at 200 cycles.

Batteries A to F had electrodes each having a size of 36 cm$^2$, of which the negative electrodes were 2.0 Ah and the positive electrodes were 1.8 Ah. Each of these batteries was charged and discharged with a current of 2 A. The charge was carried out by using a charger, and the charging time was longer than the discharging time by 20%. After 200 cycles of charge and discharge were repeated, the final discharge voltage was 5.0 V. A change of the discharge capacity obtained in this test is shown in Table 1. FIG. 2 is a graph showing the relationship between the discharge capacity at 200 cycles and the working pressure of the safety valves.

TABLE 1

| Battery | Working pressure of safety valve (atm) | Discharge capacity (Ah) | | | | | |
|---|---|---|---|---|---|---|---|
| | | 2nd cycle | 20th cycle | 50th cycle | 100th cycle | 150th cycle | 200th cycle |
| A | No safety valve | 17.9 | 16.1 | 14.1 | 7.8 | 3.8 | 1.7 |
| B | 1.2 | 18.0 | 16.9 | 16.3 | 16.2 | 16.1 | 16.1 |
| C | 3 | 17.8 | 17.0 | 16.7 | 16.4 | 16.3 | 16.2 |
| D | 4 | 17.7 | 17.2 | 16.8 | 16.3 | 16.2 | 16.1 |
| E | 6 | 17.8 | 17.3 | 16.9 | 16.3 | 15.7 | 15.4 |
| F | 9 | 17.9 | 17.6 | 17.2 | 15.4 | 9.5 | 4.3 |

As shown in Table 1, in the case of Batteries B to E, the discharge capacity was decreased by about 5 to 10% at initial charge and discharge cycles. When 200 cycles of charge and discharge were repeated, the degree in the discharge capacity stopped decreasing, and the total decrease was found to be about 10% of the initial discharge capacity. In the case of Battery A, 40% of the initial discharge capacity was lost at 100 cycles, and little discharge capacity remained at 200 cycles. In the case of Battery F, the discharge capacity was slightly less than those of Batteries B to E at 100 cycles, but the discharge capacity was rapidly decreased after 100 cycles. Accordingly, it is noted that Batteries B to E have more excellent charge and discharge cycle life compared with that of Batteries A and F.

The battery life is prolonged or shortened depending on the decrease in the electrolyte during overcharge and the difference of discharge capacity between the respective cells which is caused by the decrease in the electrolyte.

More specifically, in the case of Battery A which is not provided with a lid, oxygen gas is not absorbed at the negative electrodes under atmospheric pressure, so that oxygen gas generated by the decomposition of water during overcharge is not reduced to water. Accordingly, the discharge capacity of each cell is decreased at approximately the same speed, and the discharge capacity is gradually decreased as shown in Table 1.

In the case of Battery F, it was observed that crystal of KOH was deposited on the peripheral portion of the safety valve and on the contact portion between the case and the lid. This result shows that oxygen gas was not absorbed at the negative electrodes during overcharge since a great amount of the electrolyte was poured into each cell chamber when this battery was produced. Moreover, oxygen gas generated during overcharge was not desorbed outside the case because of high working pressure of the safety valve, and the internal pressure continued to increase in the course of the repetition of the charge and discharge cycles. Finally, the contact portion between the case and the lid was broken at about 100 cycles, and the electrolyte leaked out, leading to a decrease in the amount of the electrolyte and a decrease in the discharge capacity. It is considered from this result that after this battery was damaged, the discharge capacity was decreased in the same way as that in Battery A.

In the case of Batteries B to E, even though the liquid level of each cell was high, oxygen gas generated during overcharge was desorbed outside the case without greatly increasing the internal pressure because of low working pressure of the safety valve. At this time, the discharge capacity was slightly decreased due to the decrease in the electrolyte. However, when the amount of the electrolyte reached an appropriate value, the negative electrodes started absorbing oxygen gas and the internal pressure of each cell became constant. Then, the amount of electrolyte stopped decreasing and the discharge capacity became constant. As described above, the charge and discharge cycles were repeated until the discharge capacity became constant, thereby providing a secondary battery having stable capacity.

In order to obtain the effects of the discharge capacity according to the present invention, the working pressure G of the safety valves is preferably in the range of $1.2 \leq G \leq 4$ as shown in FIG. 2. The safety valves working at the above pressure are useful for the secondary battery with a long life and high capacity.

Example 2

Hydrogen-absorbing electrodes (size: 36 cm² and discharge capacity: 2.0 Ah) for negative electrodes were produced in the same way as in Example 1. Then, 11 negative electrodes and 10 nickel positive electrodes (size: 36 cm² and discharge capacity: 1.8 Ah) put in separators in a bag shape were alternately combined to form a group of electrodes. This group of electrodes was put in each cell chamber in a battery case comprising 5 cell chambers. Next, an aqueous KOH solution having a specific gravity of 1.25 (25° C.) as an electrolyte was poured into each cell chamber, 10 ml at a time. Safety valves working at pressure G of 3 atm were provided on a lid, and a nickel-hydrogen secondary battery having an output voltage of 6 V was formed by connecting 5 cell chambers in series. Moreover, the side surface of the battery was reinforced with a metal plate in the same way as in Example 1. This battery was denoted as Battery G. In the same way, batteries in which electrolytes were poured by 30 ml, 50 ml, and 90 ml portions were denoted as Batteries H, I, and J, respectively.

Figure 3:
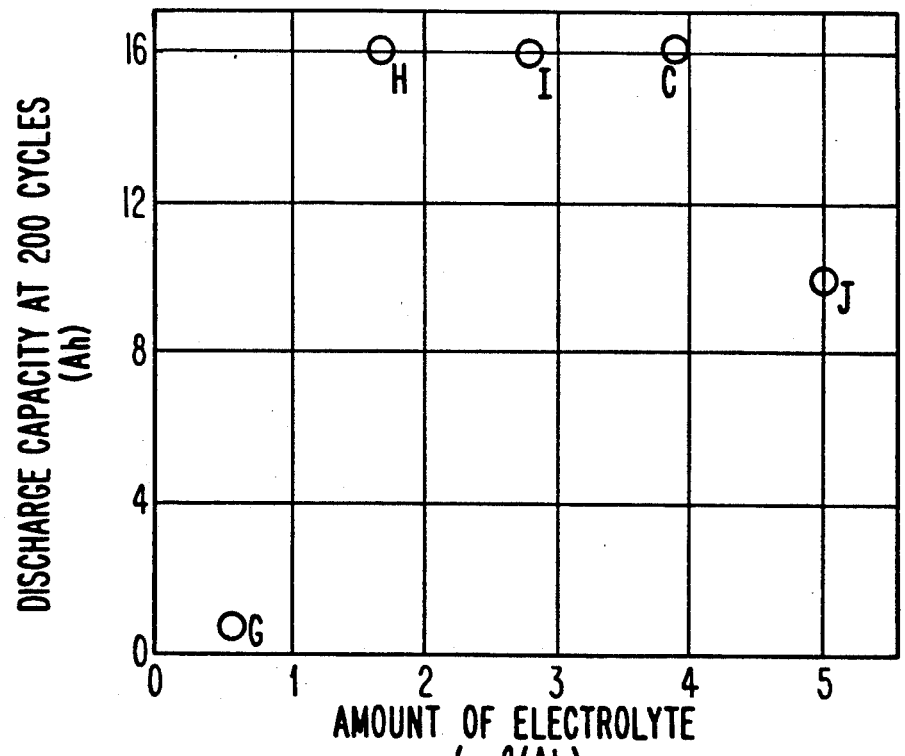
FIG. 3 is a graph showing the relationship between the amount of electrolyte and the discharge capacity of respective Batteries C and G to J of Example 2 at 200 cycles.

Batteries G to J were charged and discharged with a current of 2 A. The charge was carried out by using a charger, and the charging time was longer than the discharging time by 20%. After 200 cycles of charge and discharge were repeated, and the final discharge voltage was 5.0 V. A change of the discharge capacity of these batteries are shown in Table 2. FIG. 3 is a graph showing the relationship between the discharge capacity and the amount of the electrolyte at 200 cycles. The result of Battery C obtained in Example 1 is also shown in FIG. 3.

TABLE 2

| Battery | Amount of electrolyte (ml/Ah) | Discharge capacity (Ah) | | | | | |
|---|---|---|---|---|---|---|---|
| | | 2nd cycle | 20th cycle | 50th cycle | 100th cycle | 150th cycle | 200th cycle |
| G | 10 (0.56) | 14.9 | 10.1 | 3.1 | 2.0 | 1.2 | 0.7 |
| H | 30 (1.67) | 17.3 | 16.8 | 16.7 | 16.3 | 16.2 | 16.1 |
| I | 50 (2.78) | 17.7 | 17.0 | 16.8 | 16.5 | 16.3 | 16.1 |
| C | 70 (3.89) | 17.8 | 17.0 | 16.7 | 16.4 | 16.3 | 16.2 |
| J | 90 (5.00) | 18.2 | 17.4 | 16.2 | 14.0 | 12.3 | 10.0 |

As shown in Table 2, Battery G had an initial discharge capacity of about 15 Ah, and at 50 cycles, little discharge capacity remained. In the case of Battery J, even though the initial characteristics were satisfactory, the discharge capacity at 200 cycles was about 50% of the initial discharge capacity. In the case of Batteries H, I, and C, the discharge capacity was slightly decreased between 20 and 200 cycles, and the discharge capacity was more than 16 Ah at 200 cycles.

The battery life is prolonged or shortened depending on the difference of the amount of the electrolyte in each cell. When the amount of the electrolyte in each cell is appropriate, the decrease in the electrolyte is due to the generation of oxygen gas during overcharge. As the amount of the electrolyte is decreased, the oxygen gas-absorptivity at the negative electrodes is increased. Finally, the liquid level reaches a value at which the amount of oxygen gas generated at the positive electrodes comes to equilibrium with the amount of oxygen gas absorbed at the negative electrodes, and then the amount of the electrolyte stopped decreasing.

When the amount of the electrolyte is large, little oxygen gas is absorbed at the negative electrodes. As a result, the negative electrodes which are previously designed to have larger discharge capacity than the positive electrodes are completely charged, and hydrogen is generated at the negative electrodes. Accordingly, even when the amount of the electrolyte reaches a value at which oxygen gas is effectively absorbed, the internal pressure is increased due to the generation of hydrogen. The amount of the electrolyte continues to decrease, and the internal resistance is increased, leading to a decrease in the discharge capacity. When the amount of the electrolyte is small, the internal resistance is increased due to the lack of the electrolyte. In this case, it is considered that the decrease in the discharge capacity occurs at the initial stage.

As shown in FIG. 3, it is preferred that the amount of the electrolyte is in the range of 1.5 to 4.0 ml per discharge capacity of the positive electrodes.

Example 3

In the same way as in Example 1, hydrogen-absorbing electrodes (size: 36 cm$^2$, discharge capacity: 2.0 Ah) for negative electrodes were produced. A copolymer of tetrafluoro ethylene-hexafluoro propylene (hereinafter, referred to as FEP) was coated on both surfaces of these electrodes to an amount of 0.8 mg/cm$^2$. Then, 11 negative electrodes and 10 nickel positive electrodes (size: 36 cm$^2$, discharge capacity: 1.8 Ah) put in separators in a bag shape were alternately combined to form a group of electrodes. This group of electrodes was put in each cell chamber in a battery case comprising 5 cell chambers. Next, as an electrolyte, an aqueous KOH solution having a specific gravity of 1.25 (25° C.) was poured into each cell chamber, 70 ml at a time. Safety valves working at pressure G of 3 atm were provided on a lid, and a nickel-hydrogen secondary battery having an output voltage of 6 V was produced by connecting 5 cell chambers. Moreover, the side surface of the case was reinforced with a metal plate in the same way as in Example 1. This battery was denoted as Battery K.

Battery K was charged and discharged with a current of 2 A. The charging time was longer than the discharging time by 20%. After 200 cycles of charge and discharge were repeated, the final discharge voltage were 5.0 V. A change of the discharge capacity is shown in Table 3 together with the result of Battery C obtained in Example 1.

TABLE 3

| Battery | FEP coating | Discharge capacity (Ah) | | | | | |
|---|---|---|---|---|---|---|---|
| | | 2nd cycle | 20th cycle | 50th cycle | 100th cycle | 150th cycle | 200th cycle |
| C | Not coated | 17.8 | 17.0 | 16.7 | 16.4 | 16.3 | 16.2 |
| K | coated | 18.1 | 17.6 | 17.5 | 17.4 | 17.3 | 17.3 |

As shown in Table 3, in the case of Battery K, the discharge capacity was decreased by about 5% of the initial discharge capacity at 200 cycles. This shows that the retention of the discharge capacity in Battery K is more excellent compared with Battery C. The excellence of Battery K results from the following fact.

When the negative electrodes start absorbing oxygen gas and the oxygen gas is reduced to water, the decrease in the discharge capacity caused by the decrease in the electrolyte can be prevented. In the case of Battery C, this reaction is not carried out at the initial stage, so that the electrolyte is decreased, leading to a decrease in the discharge capacity. In the case of Battery K, the negative electrodes which are covered with FEPs which are hydrophobic resins have water repellency, so that an oxygen gas-absorbing reaction which is a reaction between gas phase and solid phase can be effectively carried out from the initial stage. As a result, the oxygen gas is readily reduced to water, thereby preventing the electrolyte from decreasing.

Example 4

In the same way as in Example 1, hydrogen-absorbing electrodes (size: 36 cm$^2$, discharge capacity: 2.0 Ah) for negative electrodes were produced. These negative electrodes were used to form a group of electrodes in the same way as in Battery G. Then, this group of electrodes was put in each cell chamber in a battery case comprising 5 cell chambers. An aqueous KOH solution having a specific gravity of 1.10 (25° C.) was poured into each cell chamber, 70 ml at a time, and safety valves working at pressure G of 3 atm were provided on a lid. A nickel-hydrogen secondary battery having an output voltage of 6 V was formed by connecting 5 cell chambers in series. Moreover, the side surface of the case was reinforced with a metal plate in the same way as in Example 1. This battery was denoted as Battery L. In the same way, batteries which use, as an electrolyte, an aqueous KOH solution having a specific gravity of 1.15, 1.20, 1.30, and 1.35 (at 25° C., respectively) were produced. These batteries were denoted as Batteries M, N, O, and P.

Figure 4:
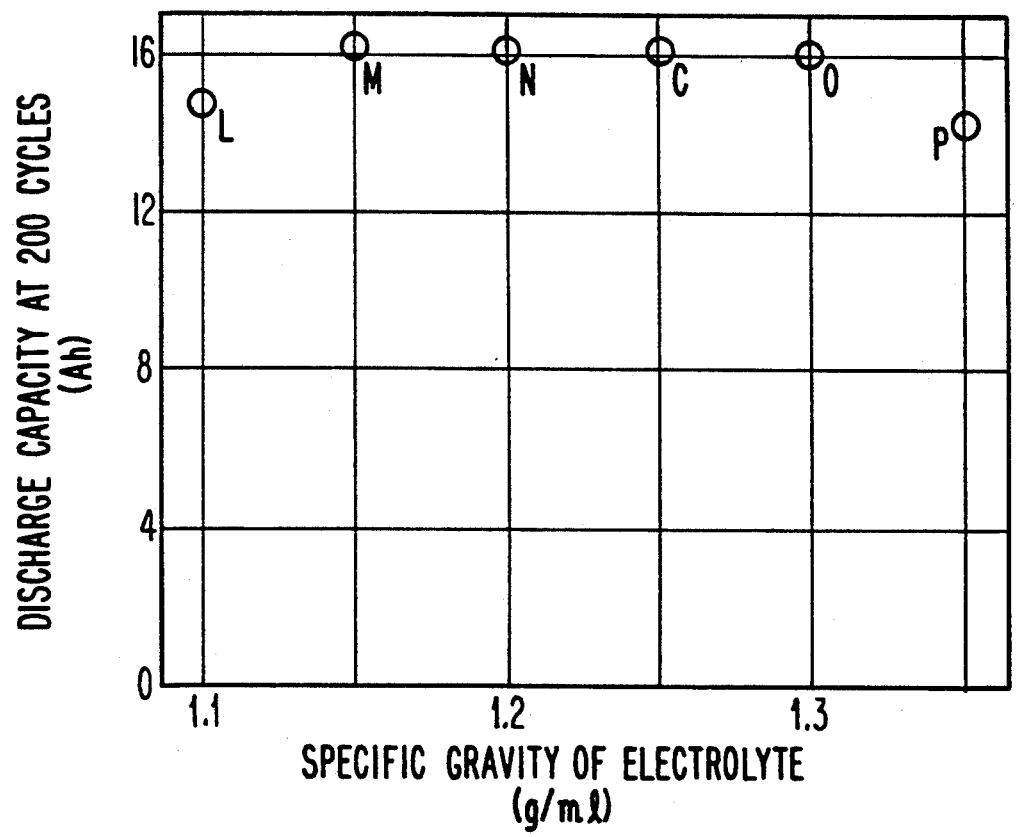
FIG. 4 is a graph showing the relationship between the specific gravity of electrolyte and the discharge capacity of respective Batteries C and L to P of Example 4 at 200 cycles.

Batteries L to P were charged and discharged with a current of 2 A. The charging time was longer than the discharging time by 20%. After 200 cycles of charge and discharge were repeated, the final discharge voltage was 5.0 V. A change of the discharge capacity is shown in Table 4. FIG. 4 is a graph showing the relationship between the discharge capacity and the specific gravity of the electrolyte together with the result of Battery C obtained in Example 1.

TABLE 4

| Battery | Specific gravity of electrolyte | Discharge capacity (Ah) | | | | | |
|---|---|---|---|---|---|---|---|
| | | 2nd cycle | 20th cycle | 50th cycle | 100th cycle | 150th cycle | 200th cycle |
| L | 1.10 | 15.1 | 14.9 | 14.8 | 14.8 | 14.9 | 14.7 |
| M | 1.15 | 16.6 | 16.4 | 16.3 | 16.3 | 16.3 | 16.3 |
| N | 1.20 | 17.2 | 16.9 | 16.7 | 16.4 | 16.3 | 16.2 |
| C | 1.25 | 17.8 | 17.0 | 16.7 | 16.4 | 16.3 | 16.2 |
| O | 1.30 | 17.8 | 16.9 | 16.6 | 16.4 | 16.2 | 16.1 |
| P | 1.35 | 18.2 | 17.6 | 17.2 | 16.0 | 15.1 | 14.2 |

As shown in Table 4, Battery L had an initial discharge capacity of about 15 Ah. In the case of Battery P, even though the initial characteristics were satisfactory, the discharge capacity at 200 cycles was about 14 Ah. In the case of Batteries M to O and C, even though the discharge capacity was decreased by a few percent at the initial stage, little discharge capacity was decreased between 20 and 200 cycles, and the discharge capacity was more than 16 Ah at 200 cycles.

It is considered that the battery life is prolonged or shortened depending on the difference of the concentration of the electrolyte. When the concentration of the aqueous KOH solution is high, the initial discharge capacity is large. However, since KOH is highly corrosive, the cycle life is degraded. In contrast, when the concentration of the aqueous KOH solution is low, the battery life is satisfactory. However, the discharge capacity becomes small as a whole. In particular, this tendency is observed in a battery system which is rich in its electrolyte. Accordingly, as shown in FIG. 4, in view of the balance of battery characteristics, it is preferred that the electrolyte has a specific gravity in the range of 1.15 to 1.30 at 25° C.

In these examples, $MmNi_{4.0}Mn_{0.3}Al_{0.3}Co_{0.4}$ was selected as a hydrogen-absorbing alloy. An $AB_5$ type multi-alloy containing Mm and Ni as its main components can be used.

Moreover, in these examples, a monoblock battery case comprising 5 cell chambers was used. Any monoblock case comprising a plurality of cell chambers can be used. Furthermore, when a plurality of monoblock cases are combined, and the charge and discharge are carried out using a total voltage of these cases, the same effects can be obtained.

As described above, according to the method of the present invention, the electrolyte in each cell chamber can be automatically regulated to a desirable amount even in a battery which has a plurality of cell chambers, each having different capacity. Therefore, a metal oxide-hydrogen secondary battery which has stable discharge capacity, satisfactory cycle life, and great discharge capacity can be provided. Moreover, the battery obtained by this method is highly safe and is easily handled.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for producing a metallic oxide-hydrogen secondary battery including positive electrodes containing one or more metallic oxides, negative electrodes containing hydrogen-absorbing alloys which electrochemically absorb and desorb hydrogen, separators, an alkaline electrolyte, a closed-type case having a plurality of cell chambers, each said cell chamber having different capacity, which accommodate said positive electrodes, said negative electrodes, said separators, and said electrolyte, and safety valves provided on respective said cell chambers in said closed-type case, wherein said method comprises the steps of:

disposing said positive electrodes, said negative electrodes, and said separators in said cell chambers in said closed-type case;

pouring said electrolyte in a predetermined amount or more into said cell chambers; and repeating charge and discharge cycles on condition that said safety valves work at pressure G in the range of $1 < G \leq 6$ atm so that the amount of said electrolyte reaches an equilibrium amount at which the amount of gas generated at the positive electrodes is in equilibrium with the amount of gas absorbed at the negative electrodes and the amount of said electrolyte in each said cell chamber is subsequently kept constant.

2. A method for producing a metallic oxide-hydrogen secondary battery according to claim 1, wherein the amount of said electrolyte is in the range of 1.5 to 4.0 ml per discharge capacity of said positive electrodes.

3. A method for producing a metallic oxide-hydrogen secondary battery according to claim 1, wherein said negative electrodes contain hydrophobic resins.

4. A method for producing a metallic oxide-hydrogen secondary battery according to claim 1, wherein the specific gravity of said electrolyte is in the range of 1.15 to 1.30 at 25° C.

5. A method for producing a metallic oxide-hydrogen secondary battery according to claim 1, wherein a charger regulating a total voltage of said battery is used for charging each said cell chamber.

6. A method for producing an alkaline metallic oxide-hydrogen secondary battery including positive electrodes containing one or more nickel hydroxides, negative electrodes containing hydrogen-absorbing alloys which electrochemically absorb and desorb hydrogen, an alkaline electrolyte, a closed-type case made of plastics having a plurality of cell chambers, each said cell chamber having different capacity, which accommodate said positive electrodes, said negative electrodes, said separators, and said electrolyte, and safety valves provided on respective said cell chambers in said closed-type case, wherein said method comprises the steps of:

disposing said positive electrodes, said negative electrodes, and said separators in said cell chambers in said closed-type case;

pouring said electrolyte in a predetermined amount or more into said cell chambers; and repeating charge and discharge cycles on condition that said safety valves work at pressure G in the range of $1.2 \leq G \leq 4$ atm so that the amount of said electrolyte reaches an equilibrium amount at which the amount of gas generated at the positive electrodes is in equilibrium with the amount of gas absorbed at the negative electrodes and the amount of said electrolyte in each said cell chamber is subsequently kept constant.

* * * * *